Figure 1:
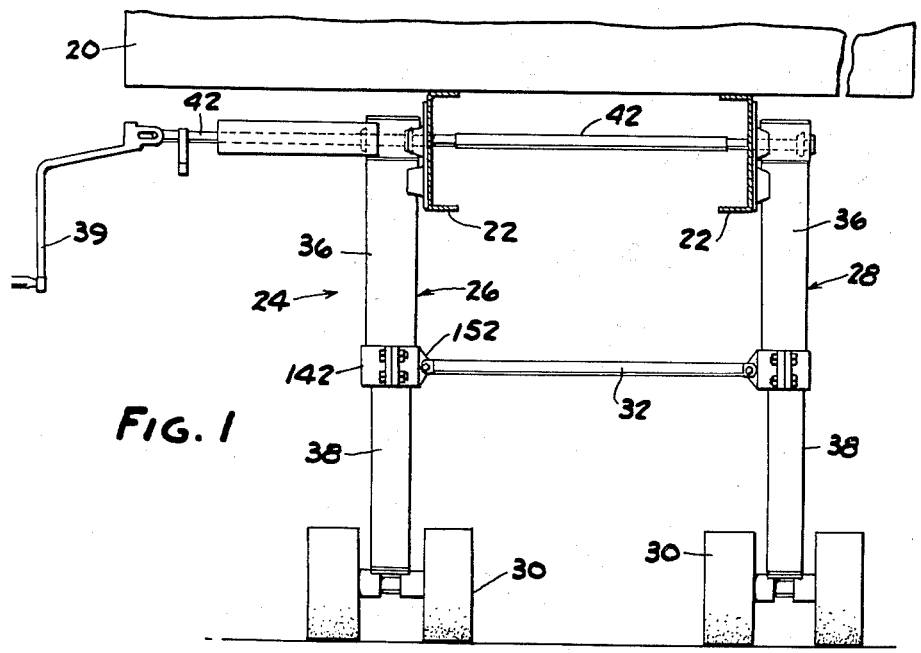

Nov. 20, 1962 T. B. DALTON 3,064,944
LANDING GEAR LEG STRUCTURE

Original Filed July 1, 1960 7 Sheets-Sheet 1

INVENTOR.
THOMAS B. DALTON
BY
Barnes, Kisselle, Raisch & Choate
ATTORNEYS

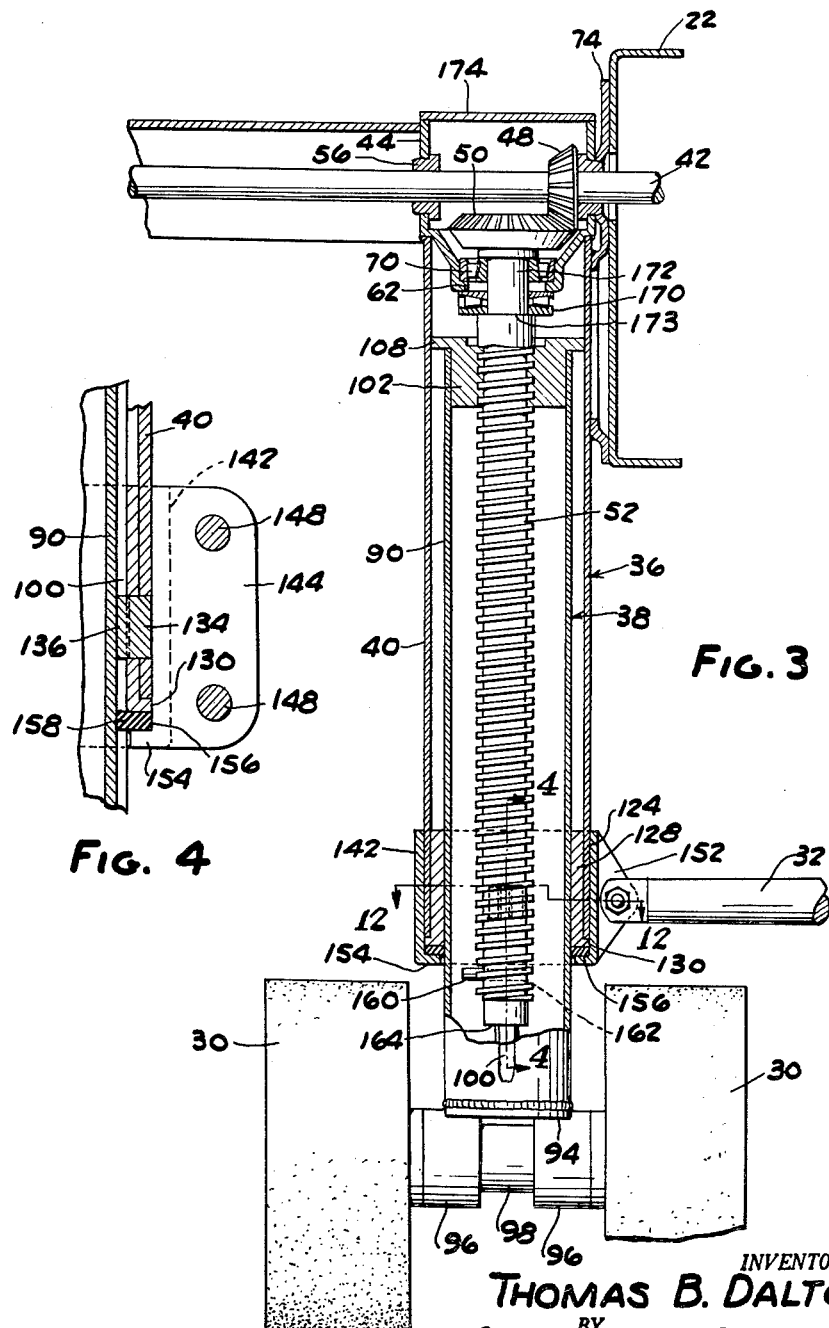

Nov. 20, 1962 T. B. DALTON 3,064,944
LANDING GEAR LEG STRUCTURE
Original Filed July 1, 1960 7 Sheets-Sheet 3

INVENTOR.
THOMAS B. DALTON
BY
Barnes, Kisselle, Raisch & Choate
ATTORNEYS

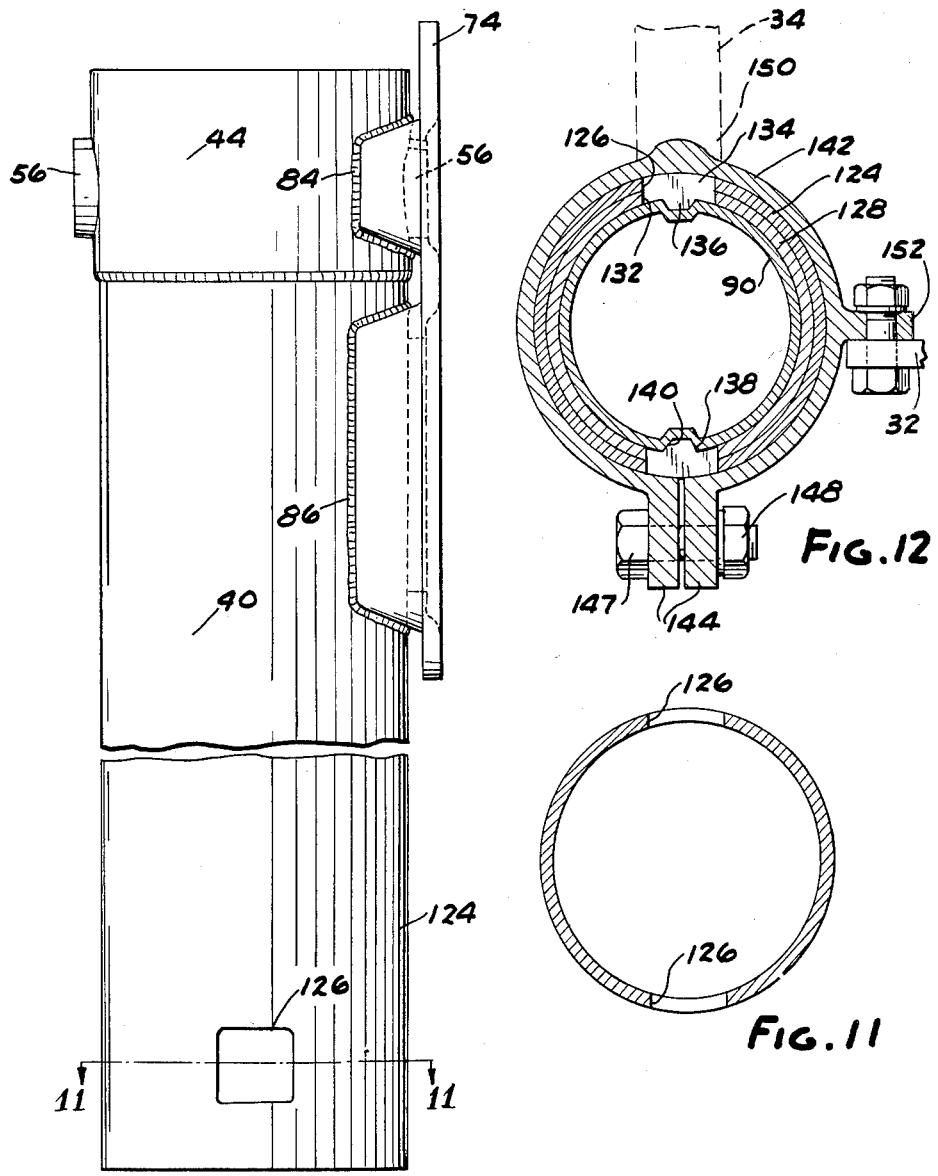

Nov. 20, 1962  T. B. DALTON  3,064,944
LANDING GEAR LEG STRUCTURE
Original Filed July 1, 1960  7 Sheets-Sheet 6

INVENTOR.
THOMAS B. DALTON
BY
ATTORNEYS

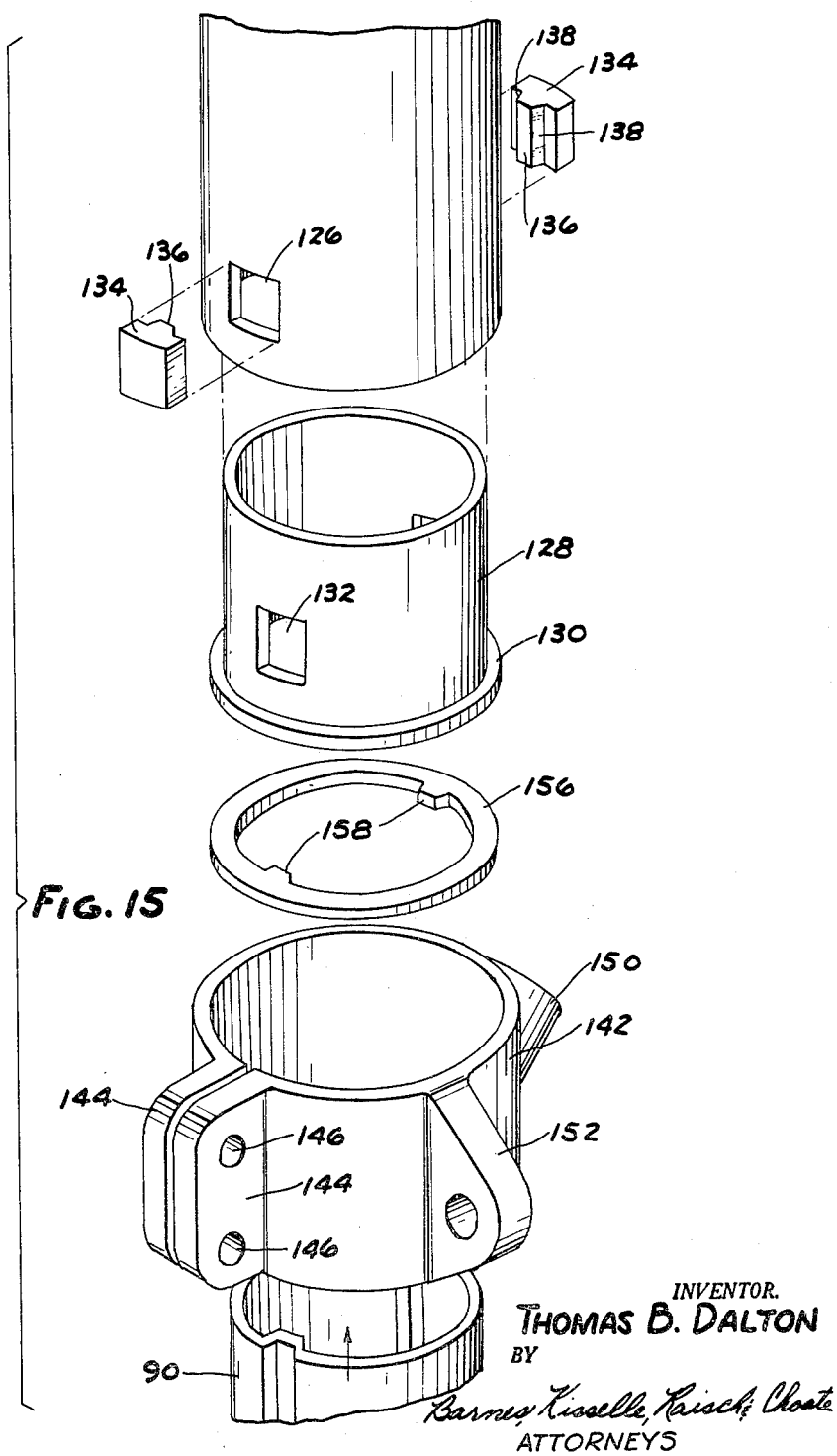

United States Patent Office 3,064,944
Patented Nov. 20, 1962

3,064,944
LANDING GEAR LEG STRUCTURE
Thomas B. Dalton, Muskegon, Mich., assignor to West Michigan Steel Foundry Company, Muskegon, Mich., a corporation of Michigan
Original application July 1, 1960, Ser. No. 40,238. Divided and this application Apr. 12, 1961, Ser. No. 102,479
7 Claims. (Cl. 254—86)

This invention relates to a leg structure in the legs of landing gear of the type used to support the forward end of a semi-trailer when it is uncoupled from a tractor.

This application is a division of my co-pending application Serial No. 40,238 filed July 1, 1960, and entitled "Landing Gear Leg Structure."

Conventionally, a landing gear leg comprises upper and lower tubular leg members which telescope relative to each other for lengthening the leg to a trailer supporting position and shortening it to a retracted position. The leg members are actuated by a jackscrew and nut mechanism with a shaft and gearing for operating the jackscrew being mounted in a housing adjacent the top of the upper leg.

Heretofore, the gear housing has consisted of a relatively heavy casting which had to be machined at numerous places to provide surfaces suitable for engaging other components of the leg assembly. Heretofore, the various means for securing the leg members against relative rotation have not been completely satisfactory from the standpoint either of manufacturing cost or freedom from failure in use.

The object of this invention is to provide a strong landing gear leg structure which is lighter in weight and less expensive of manufacture than previous structures and which has improved means for securing the upper and lower leg members against relative rotation in use.

Generally the invention contemplates forming the jackscrew gear housing of a cup-shaped metal stamping which is pierced to provide the various openings required therein, the surfaces provided by the drawing or stamping and piercing, without being further machined, being engaged directly against other components of the landing gear. The inner lower leg member is indented to provide an external groove engaged by a spline on the upper leg member. The components are arranged to facilitate rapid convenient assembly during manufacture by inserting an assembly of the lower leg member, jackscrew, and nut upwardly into the upper leg member.

Figure 2:
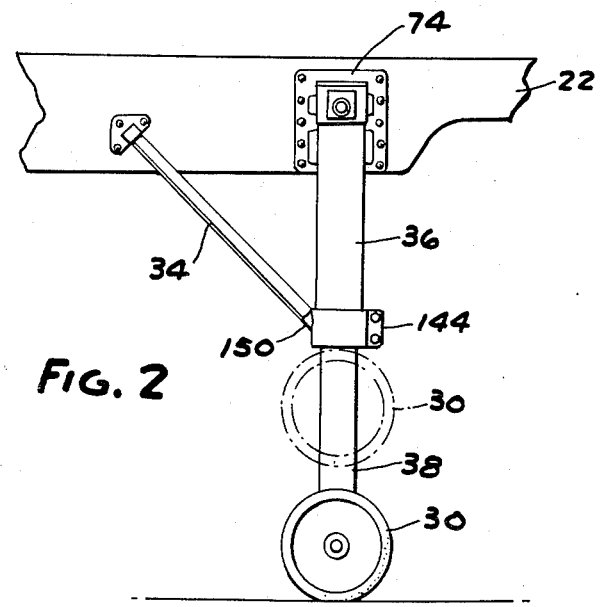
Figure 5:
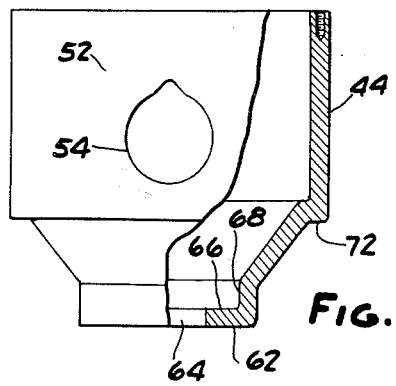
Figure 6:
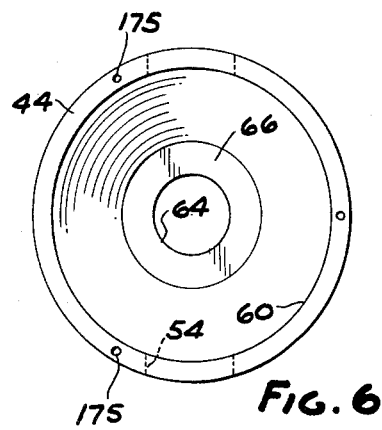
Figure 8:
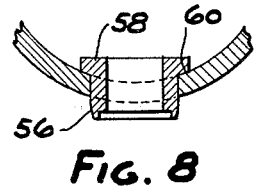
Figure 7:
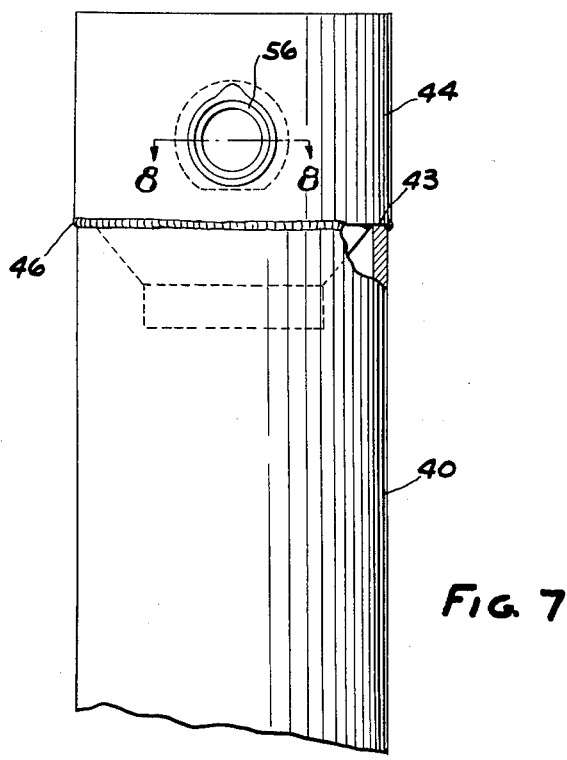
Figure 9:
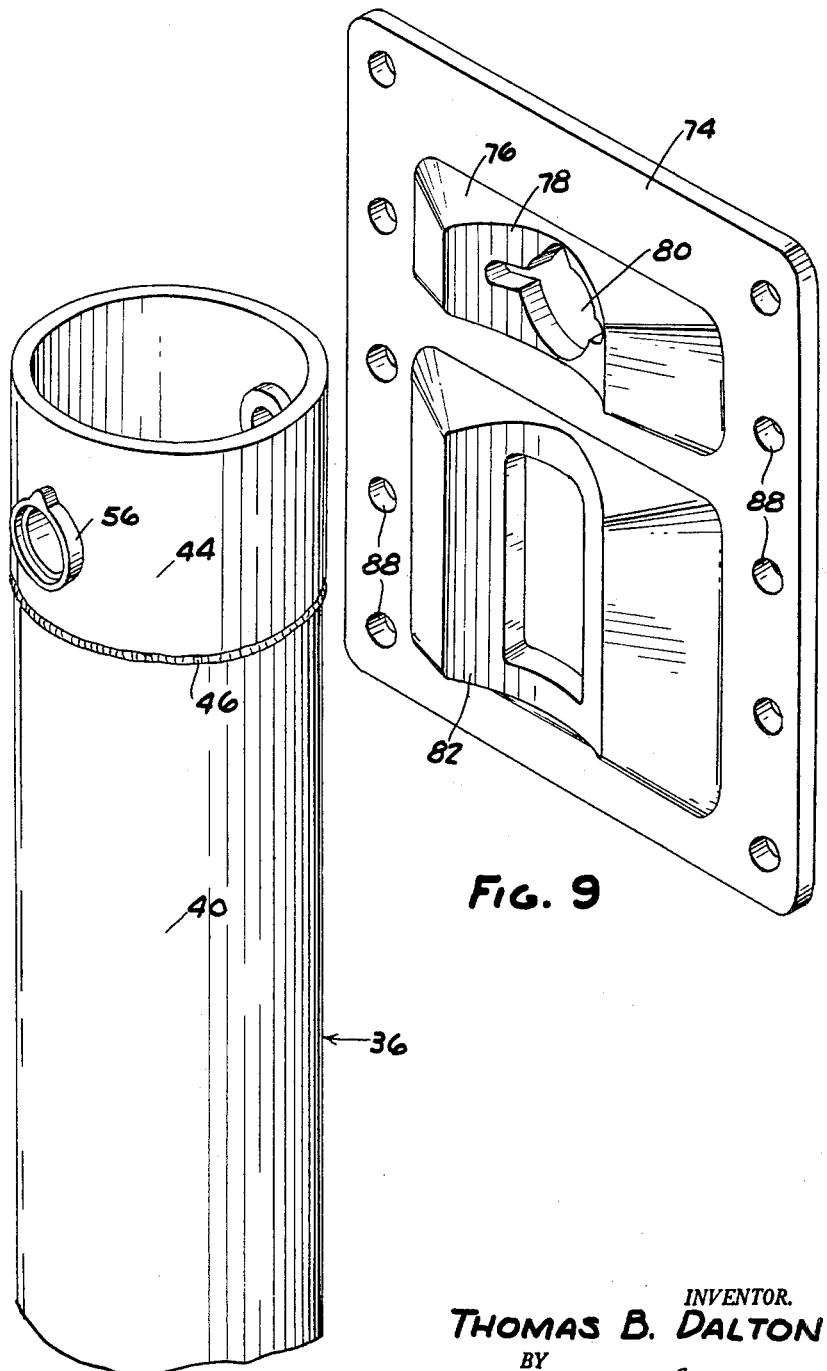
Figures 13, 14:
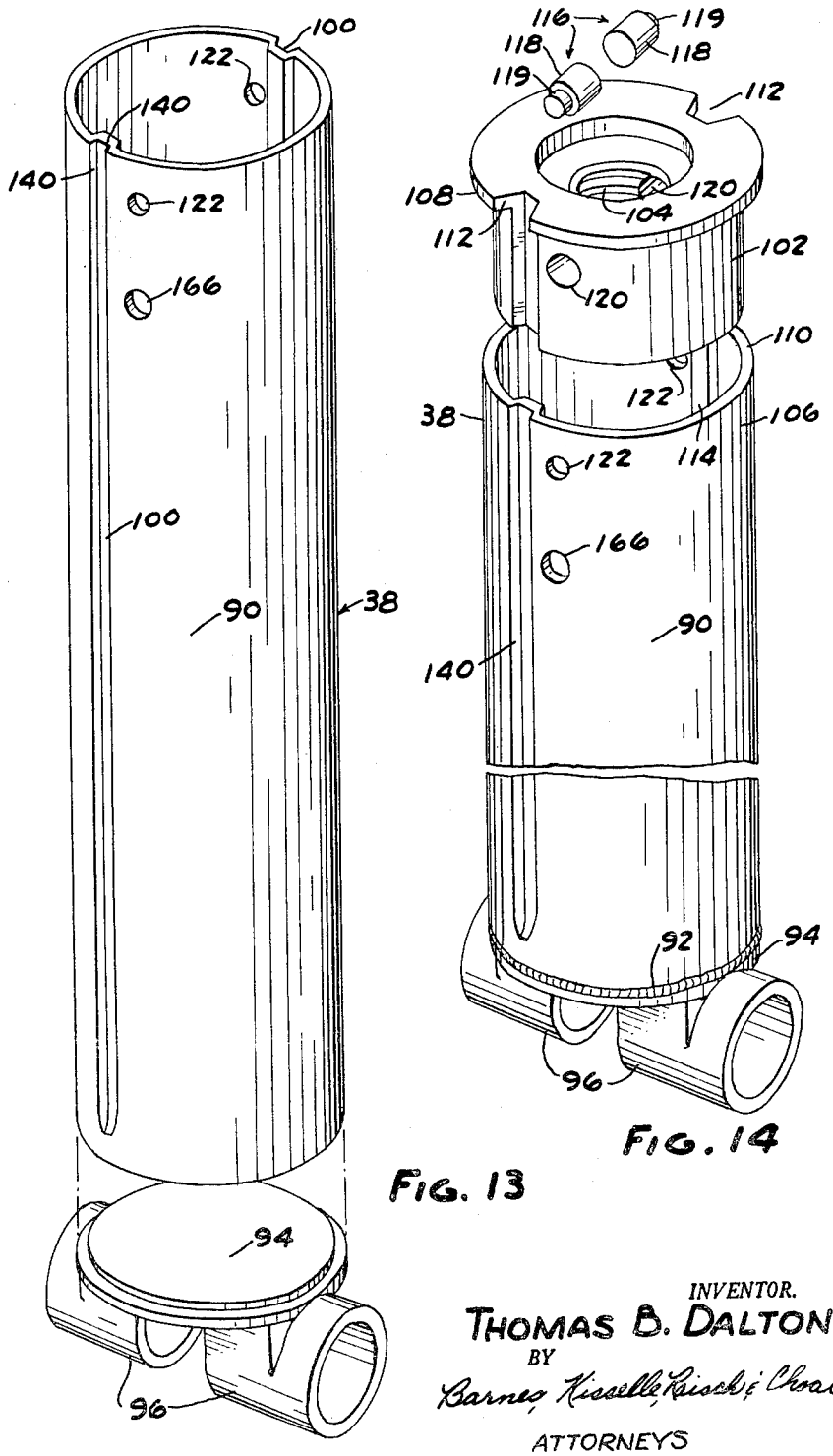

In the drawings:
FIG. 1 is generally a front elevational view of a semi-trailer landing gear having a leg structure according to the present invention.
FIG. 2 is a side elevational view of the landing gear with the ground engaging wheels being shown in dotted lines in a retracted position.
FIG. 3 is an enlarged generally vertical sectional view of the landing gear leg.
FIG. 4 is an enlarged sectional view on line 4—4 in FIG. 3.
FIG. 5 is an elevational view of a stamping forming the gear housing at the upper end of the leg, with a portion broken away to illustrate structure.
FIG. 6 is a plan view of the stamping.
FIG. 7 is an elevational view illustrating the stamping welded to the top of the leg, a portion being broken away and portions being shown in phantom to illustrate structure.
FIG. 8 is a sectional view on line 8—8 of FIG. 7.
FIG. 9 is a perspective exploded view illustrating the relation between the upper end of the leg and its mounting plate.
FIG. 10 is an elevational view illustrating the upper leg member welded to the mounting plate.
FIG. 11 is a section on line 11—11 of FIG. 10.
FIG. 12 is an enlarged sectional view on line 12—12 of FIG. 3 with the jackscrew omitted.
FIG. 13 is a perspective exploded view of the lower leg member and its bottom plate.
FIG. 14 is a perspective exploded view of the lower leg member and jackscrew nut prior to their assembly.
FIG. 15 is an exploded perspective view illustrating the parts forming the connection between the upper and lower leg members prior to assembly thereof.

Shown in the drawings is the forward end of a semi-trailer 20 having frame members 22 to which a landing gear 24 is secured. The landing gear legs 26 and 28 are constructed in accordance with this invention and are identical except for having right and left hand relation. Each leg has ground engaging means such as wheels 30 at its lower end. A lateral brace 32 is provided between the legs and each leg has a rear supporting strut 34 anchored at its upper end to frame 22. Each leg includes an upper tubular member 36 and a lower tubular member 38 which are telescoped vertically by means of a jackscrew mechanism to be described which is operated by a crank 39 through shafting 42. Upper leg member 36 comprises a tube 40 having an upper end face 43 (FIG. 7) to which a cup-shaped stamping 44 is secured by welding 46. Stamping 44 provides a housing for bevel gears 48 and 50 (FIG. 3) through which a jackscrew 52 is operated by rotation of shafting 42.

Stamping 44 has cylindrical side walls 52 which are pierced to provide openings 54 into which bushings 56 are press fitted for receiving shaft 42. Each bushing 56 has a flange 58 which engages a surface portion 60 of the stamping immediately surrounding opening 54. Stamping 44 has a bottom portion 62 pierced to provide an opening 64 through which the upper end of jackscrew 52 passes. Immediately surrounding opening 64 is a radial surface 66 and a contiguous axial or vertical surface 68, these surfaces containing a bearing 70 providing a journal for the upper end of jackscrew 52. Stamping 44 has an external annular face 72 which seats directly against end face 43 of tube 40 when the stamping is welded to the end of the tube. Stamping surfaces 60, 62, 66, 68 and 72 are the drawn metal surfaces provided during the stamping or drawing of cup 44. These surfaces are engaged against the other components of the leg structure without further machining. Similarly, the surfaces defining bushing openings 54 and jackscrew opening 64 are the surfaces provided by piercing of the metal of cup 44 without further machining.

After cup 44 has been welded to tube 40 and bushings 56 press fitted into openings 44, the resulting upper leg member 36 is assembled with a mounting plate 74 (FIGS. 9 and 10). Plate 74 has an upper saddle 76 with a concave surface 78 which seats against the cylindrical exterior of cup 44. The saddle has an opening 80 into which an exteriorly projecting portion of bushing 56 fits. Plate 74 has a second saddle 82 engaged by the cylindrical exterior of tube 40. The cup and tube are welded to the saddles as at 84 and 86 (FIG. 10). Mounting plate 74 has flange portions with bolt holes 88 to facilitate bolting onto trailer frame 22.

Lower leg member 38 comprises a tube 90 having welded at its lower end as at 92 (FIG. 14) a cover plate 94 which carries a pair of bearings 96 which receive an axle 98 on which ground engaging wheels 30 are mounted. Tube 90 has one or more longitudinal grooves 100 in its external surface and these grooves extend longitudinally a distance at least as great as the extension and retracting stroke of the lower leg member in moving to and from its ground engaging and retracted positions. The grooves are preferably formed by deforming the metal of the tube wall inwardly by a rolling process. By this means the grooves can be given considerable depth, for example a depth equal to the thickness of the tube wall as shown in FIG. 12. Where two grooves are used as in the illustration, the grooves are preferably disposed diametrically opposite each other. This facilitates roll forming of the grooves and also enables the grooves to be positioned at the forward and rearward extremities of the leg relative to the longitudinal direction of the vehicle so that the metal forming the grooves also provide stiffening ribs which resist bending or distortion of the lower legs when the vehicle is moved over a surface on its landing gear wheels 30.

A jackscrew nut 102 having internal threads 104 for engagement with jackscrew 52 is secured within the upper end portion 106 of leg tube 90 with an outward flange 108 on the nut engaging the upper end face 110 of the tube. In heavy duty gear, flange 108 has a diameter greater than the outer diameter of tube 90 for a purpose to be described. Nut 102 has longitudinal recesses 112 which accommodate the elongate inward indentations 114 formed in rolling grooves 100. The nut is secured within the tube by a number of shouldered pins 116 having heads 118 and shanks 119 having a clearance fit respectively through holes 120 in the threaded portions of nut 102 and smaller holes 122 in the upper end of tube 90.

The lower end portion 124 of the upper leg tube is provided with an opening 126 for each groove 100 in the lower leg tube 90. A bearing and reinforcing sleeve 128 is interposed between lower leg portion 124 and lower leg tube 90 and this sleeve has a flange 130 adjacent its lower end which engages the lower end face of tube portion 124. Sleeve 128 has an opening 132 for each opening 126 in the upper leg tube. Openings 132 are longitudinally aligned with openings 126 when sleeve flange 130 engages the end of tube portion 124.

An insert 134 is fitted into each pair of aligned openings 126 and 132 and has a spline projection 136 which projects inwardly of sleeve 128 into slidable spline engagement with a groove 100 in the lower leg tube. The spline surfaces 138 of projection 136 and the complementary side surfaces 140 of groove 100 (FIGS. 12, 13 and 15) are disposed at obtuse angles to the intersecting tangents of lower leg tube 90 to minimize the tendency of the tube and insert to be cammed away from each other, and this, taken with the depth of the groove, insures against disengagement of the spline insert from the groove.

A split collar 142 is provided around lower portion 124 of the upper leg tube and this collar retains spline inserts 134 in place in their respective openings. Collar 142 has a pair of radial lugs 144 which have aligned openings 146 through which bolts 147 pass for threaded engagement with nuts 148 to clampingly contract the collar around the leg, sleeve, and insert assembly. Collar 142 has a rear boss 150 for engagement with rear landing gear strut 34 and has another boss 152 apertured for bolted engagement with cross brace 32 as shown.

Collar 142 has adjacent its lower end an inwardly extending annular flange 154 and a dirt and grease seal 156 is contained in wiping engagement around lower leg tube 90 between this flange and flange 130 on sleeve 128. Seal 156 is made of a suitable sealing material such as a natural or synthetic rubber or other elastomeric material. Seal ring 156 has a pair of inward projections 158 engageable complementarily within spline grooves 100 in the lower leg tube to maintain the continuity of the seal across the groove regions.

To assemble the leg, the upper leg member 36 is welded to its mounting plate 74 and lower leg 38 is welded to its bottom plate 94 in the manner described. Split collar 142, seal ring 156 and sleeve 128 are then inserted over the upper end of lower leg tube 90 in that order. Jackscrew nut 102 is then dropped into place in the top end of lower leg tube 90 and flange 108 brought into engagement with the top end face 110 of the tube. Tube indentations 114 engage within nut recesses 112 and holes 120 and 122 in the nut and tube respectively are aligned. Pins 116 are inserted outwardly into nut openings 120 so that their shanks 119 project into tube openings 122 and their shoulders engage the interior surface of the tube. This is easily done manually because of the clearance fit between the pins and openings. Jackscrew 52 is then threaded into the nut until a stop pin 160 (FIG. 3) press fitted into a through opening 162 in its lower end 164 is brought into alignment with a hole 166 in lower leg tube 90. (FIGS. 13 and 14.) A punch (not shown) is then inserted through hole 166 and pin 160 is driven partially out of hole 162 so that it projects radially outwardly of jackscrew 152 to provide a stop for engaging nut 102. The jackscrew retains pins 116 within openings 120 and 122.

The jackscrew is then turned all the way down to the FIG. 3 position wherein threads 104 run out and stop the screw. A thrust bearing 170 is inserted over the upper end portion 172 of the jackscrew and seated on a shoulder 173 thereon. The upper end of leg tube 90 and sleeve 128 are then inserted into lower end portion 124 of the upper leg tube and sleeve flange 130 is engaged against the bottom end of the upper tube. This aligns openings 126 and 132 in the upper tube and the sleeve. Inserts 134 are now inserted through the aligned openings with spline projections 136 engaged within grooves 100 in the lower tube. Collar 142 is now slipped upwardly around the exterior of the lower end of the upper tube until seal 156 engages sleeve flange 130. Clamping bolts 147 are now passed through their openings 146 in lugs 144 and tightened to secure lower leg portion 124, sleeve 128, inserts 136, and seal 156 in assembled relation.

Lower leg tube 90 is then slipped upwardly in the outer tube until the upper end 172 of the jackscrew passes through the bottom opening 64 in gear housing cup 44 and thrust bearing 170 engages against bottom surface 62 of the cup. Bearing 70 and beveled gearing 48 and 50 together with a portion of shafting 42 may then be installed. Gear housing 44 is then covered by a plate 174 secured in place as by screws (not shown) threaded into suitable holes 175 (FIG. 6) in the housing.

This leg structure facilitates considerable savings in the cost of manufacture which are passed on to the ultimate consumer. In part, these savings are effected by eliminating the necessity for machining operations of eight different surfaces in the gear housing head 44, these surfaces being two each at 54 and 60, and one each at 62, 66, 68 and 72 as pointed out above. The savings are also facilitated in part by the simple assembly procedure described. One feature adding to simplicity of assembly is that lower end plate 94 with its bearing elements 96, nut 102, jackscrew 52 and thrust bearing 170 can all be assembled to lower leg tube 90 before the latter is inserted into outer leg tube 40. In this regard it is to be noted that nut flange 108 has a diameter no greater than the inner diameter of the lower end portion 124 of the outer tube.

The lower end 124 of tube 40 co-operates with sleeve 128 and collar 142 to provide strong lateral support for the lower leg 38 in its downward position. Engagement of nut flange 108 with the interior of outer leg tube 40 supplements this support, enabling the gear to be used under severe conditions such as where the supported vehicle, which may be an army vehicle, is operated over relatively rough ground. Where the vehicle is to be operated only on relatively smooth surfaces or pavement as commercial vehicles usually are, the enlarged nut flange is unnecessary, tube end 124, sleeve 128, collar 142 and interengaged nut 102 and jackscrew 52 providing sufficient lateral support.

In use, it may be assumed that landing gear legs 26 and 28 have been assembled to semi-trailer 20 as illustrated in FIGS. 1 and 2. The legs are operated between their downward ground engaging position and their upward retracted position merely by turning operating handle 39 which rotates shafting 42 to drive jackscrew 52 through bevel gears 48 and 50. Inner tube 90 telescopes with respect to outer tube 40 in sliding engagement with the guiding and reinforcing sleeve 128 and spline projections 136 on inserts 134 engage in grooves 100 on the lower tube. Collar 142 securely holds the inserts in place and the support of the collar plus the angles and depth of the interengaging splines and grooves makes it virtually impossible for the inner and outer tubes to twist rotationally relative to each other under any loads which the landing gear is designed to operate. The spline grooves 100 in addition to acting as such serve to stiffen the lower leg tubes.

I claim:

1. In a landing gear for semi-trailers and the like of the type having upper-outer and lower-inner relatively telescoping tubular leg members actuated by a jackscrew journaled on the upper member engaged with a nut on the lower member, improved leg structure wherein said lower leg member and said nut have diameters less than the inner diameter of said upper-outer leg member so that in manufacture said lower leg member, nut and jackscrew as an assembly can be inserted upwardly through the lower end of said upper-outer leg member, a sleeve interposed between the lower end portion of the outer leg member and the inner leg member, said sleeve providing a bearing surface against which said inner leg member slidably engages and providing lateral reinforcement for said leg members, said outer leg member and said sleeve having aligned openings, an insert in said openings having an inward spline projection, said inner leg member having means defining a spline groove engaged by said projection to secure said leg members against relative rotation, and a collar clamped around said lower end portion of said outer leg member to retain said insert in place and provide further reinforcement for said leg members in extended relation thereof.

2. The combination defined in claim 1 wherein the wall of said inner leg member is deformed inwardly to form said spline groove, said groove having a depth which is about at least as great as the thickness of said wall.

3. The combination defined in claim 2 wherein said inner leg member has two of said spline grooves generally diametrically opposite each other and two of said splined inserts engaged therewith, said splined inserts and said aligned openings in said leg members cooperating to position said grooves at the forward and rearward regions of said leg structure so that they form reinforcing ribs against forces tending to bend said lower leg member when the vehicle which said leg structure supports is in motion.

4. The combination defined in claim 1 wherein said nut has a flange which projects radially into sliding engagement with the interior of the outer tube to supplement the lateral strength of said leg structure.

5. The combination defined in claim 1 wherein said sleeve has an outward flange which engages the lower end of said outer leg member when said apertures in said outer leg member and sleeve are longitudinally aligned.

6. The combination defined in claim 1 wherein said collar has an inward flange, a seal contained by said flange in slidable sealing engagement against said inner leg member below said outer leg member, said seal having inwardly projecting portions complementally engaging within said spline groove to provide a continuous seal across the grooved regions of said inner leg member.

7. The combination defined in claim 5 wherein said collar has an inward flange, a seal contained between said collar flange and sleeve flange in slidable sealing engagement against said inner leg members below said outer leg member, said seal having inwardly projecting portions complementally engaging within said spline groove to provide a continuous seal across the grooved regions of said inner leg member.

References Cited in the file of this patent

UNITED STATES PATENTS

| | | |
|---|---|---|
| 1,073,294 | Siewert | Sept. 16, 1913 |
| 2,232,187 | Reid | Feb. 18, 1941 |
| 2,446,517 | Black | Aug. 10, 1948 |
| 2,503,738 | Horton | Apr. 11, 1950 |
| 2,523,152 | Seyforth | Sept. 19, 1950 |
| 2,695,504 | Magee | Nov. 30, 1954 |
| 2,896,967 | Dalton | July 28, 1959 |